(12) United States Patent
Ninawe et al.

(10) Patent No.: US 12,380,896 B1
(45) Date of Patent: Aug. 5, 2025

(54) AUDIO SPEECH SIGNAL ANALYSIS FOR FRAUD DETECTION

(71) Applicant: Morgan Stanley Services Group Inc., New York, NY (US)

(72) Inventors: Sushil Ninawe, Mumbai (IN); Jayati Tripathi, Bengaluru (IN); Cheryl Fernandes, Plainsboro, NJ (US); Mehak Mehta, Jersey City, NJ (US); Aratrika Sarkar, Jersey City, NJ (US); Melissa Kagaju, New York, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/194,354

(22) Filed: Apr. 30, 2025

Related U.S. Application Data

(63) Continuation-in-part of application No. 18/942,728, filed on Nov. 10, 2024, now Pat. No. 12,323,554.

(51) Int. Cl.
| | | |
|---|---|---|
| *G10L 21/00* | (2013.01) | |
| *G06Q 20/40* | (2012.01) | |
| *G10L 15/18* | (2013.01) | |
| *G10L 17/26* | (2013.01) | |
| *H04M 3/42* | (2006.01) | |
| *H04M 3/58* | (2006.01) | |

(52) U.S. Cl.
CPC ............ *G10L 17/26* (2013.01); *G06Q 20/407* (2013.01); *G10L 15/1807* (2013.01); *H04M 3/42221* (2013.01); *H04M 3/58* (2013.01)

(58) Field of Classification Search
CPC ......... G10L 15/02; G10L 15/22; G10L 15/26; G10L 15/28; G10L 25/72; H04L 63/1425; H04L 63/1408; H04M 3/2281; H04M 3/5175; G06F 40/40; G06F 18/24133; G06F 18/2413
USPC ........................................................ 704/270
See application file for complete search history.

(56) References Cited

U.S. PATENT DOCUMENTS

| | | |
|---|---|---|
| 9,237,232 B1 | 1/2016 | Williams et al. |
| 9,716,791 B1 | 7/2017 | Moran |
| 10,484,532 B1 | 11/2019 | Newman et al. |
| (Continued) | | |

FOREIGN PATENT DOCUMENTS

CN       113611318 A  * 11/2021  ............. G10L 21/02

*Primary Examiner* — Md S Elahee
(74) *Attorney, Agent, or Firm* — PEARL COHEN ZEDEK LATZER BARATZ LLP

(57) ABSTRACT

A device, system and method for analyzing audio speech signals to detect fraudulent calls to a contact center comprising splitting an audio recording of a call in real-time into a foreground speech signal attributed to a main speaker and a background audio signal, extracting audio features from the foreground speech signal and background audio signal, inputting the extracted audio features into an ensemble model comprising multiple different machine learning models co-trained to cumulatively detect fraud, wherein the multiple different machine learning models include: a speaker audio model to detect audio speech anomalies, a speaker intent model to classify intent of the main speaker, a synthetic voice detection model to identify a non-human entity, and a prosody model to detect voice intonation of the main speaker. A prediction may be output, by the ensemble model, indicating whether the call is fraudulent.

22 Claims, 6 Drawing Sheets

(56) References Cited

U.S. PATENT DOCUMENTS

| | | |
|---|---|---|
| 10,573,312 B1 | 2/2020 | Thomson |
| 11,277,437 B1 | 3/2022 | Burgis |
| 11,553,080 B2 | 1/2023 | Newman et al. |
| 11,810,435 B2 * | 11/2023 | Salekin .................. G10L 15/26 |
| 2006/0262920 A1 | 11/2006 | Conway et al. |
| 2016/0379638 A1 | 12/2016 | Basye |
| 2020/0243094 A1 | 7/2020 | Thomson |
| 2021/0193174 A1 | 6/2021 | Enzinger et al. |
| 2021/0258422 A1 | 8/2021 | Haddad |
| 2022/0114593 A1 | 4/2022 | Johnson |
| 2022/0116388 A1 | 4/2022 | Johnson |
| 2024/0241924 A1 | 7/2024 | Zadeh |
| 2024/0363099 A1 | 10/2024 | Altaf |

\* cited by examiner

_US 12,380,896 B1_

AUDIO SPEECH SIGNAL ANALYSIS FOR FRAUD DETECTION

CROSS-REFERENCE TO RELATED APPLICATIONS

This Application is a continuation-in-part of U.S. patent application Ser. No. 18/942,728 filed Nov. 10, 2024, which is hereby incorporated by reference in its entirety.

FIELD OF THE INVENTION

The present invention relates generally to cybersecurity, audio speech signal analytics, generative AI and machine learning, and more specifically, to the use of those technologies for detecting and preventing fraudulent or anomalous activity attributed to a caller calling into a contact center.

BACKGROUND OF THE INVENTION

When a caller dials in to connect to a call or contact center agent, the call center may detect whether the caller is a fraudster. The call center may implement robust safeguards to prevent monetary loss, reputational loss and account takeover in order to protect an associated client or firm or their assets.

Identifying fraudulent callers may use varying techniques depending on the caller use cases, for example:
Use Case 1:
The caller is enrolled in voice authentication.
In use case 1, a caller is conventionally verified by voiceprint matching.
Use Case 2:
The caller is not enrolled in voice authentication.
The caller has made previous calls to the contact center.
The caller requests a monetary transaction (e.g., to transfer large sums from the caller's account via credit card, debit, or other transactions).
In use case 2, a caller is conventionally verified by comparing audio prints of the caller's current and previous calls.

Fraud technology, however, is getting increasingly sophisticated with the ability to impersonate another person using their voiceprint. These techniques circumvent conventional voice and audio print matching rendering use cases 1 and 2 vulnerable to fraud.
Use Case 3:
The caller is not enrolled in voice authentication.
The caller has never made previous calls to the contact center.
The caller requests a monetary transaction.
Use Case 3 is directed to "cold" calls where callers who are entirely unknown contact the call center for the first time. Fraudsters that are cold callers are notoriously difficult to detect because they have no established voice or audio prints, behavioral patterns, or prior risk assessment. There is currently no reliable speech analysis technique to accurately verify the authenticity of a cold caller.

Accordingly, there is a longfelt need inherent in the art to efficiently and accurately detect fraud risk attributed to all callers including "cold" callers that is durable to modern day fraud technology.

SUMMARY OF THE INVENTION

To solve this longfelt need inherent in the art a device, system and method is provided for analyzing audio speech signals to detect fraudulent calls to a contact center. An audio recording of a call in real-time may be split into a foreground speech signal attributed to a main speaker and a background audio signal. Audio features may be extracted from the foreground speech signal and background audio signal. The extracted audio features may be input into an ensemble model. The ensemble model may comprise multiple different machine learning models co-trained to cumulatively detect fraud. The multiple different machine learning models may include any combination of: a speaker audio model to detect audio speech anomalies in the foreground speech signal attributed by clustering to the main speaker, a speaker intent model to classify intent of the main speaker in the foreground speech signal using a large language model and call transcription, a prosody model to detect voice intonation of the main speaker in the foreground speech signal, a fraud ring model to detect fraud risk anomalies of one or more secondary speakers in the background audio signal, a synthetic audio model to detect if the main speaker is real or synthetic, a fraud vs. non-fraud cluster model, and an account specific domain model. A prediction may be output, by the ensemble model, indicating whether the call is fraudulent.

In accordance with some embodiments, an output prediction indicating the call is fraudulent may trigger a call router to intercept the fraudulent call and/or terminate the call, reroute the call by transferring the call destination to an escalated recipient, and/or add another third line to an escalated recipient. Additionally or alternatively, detecting fraud may trigger a fraud mitigation action, such as, recording the call in an escalated storage location, performing additional second-pass fraud analysis, reordering the call in a priority queue for further analysis, such as an additional fraud detection pass at the same or different more comprehensive ensemble model. Additionally or alternatively, detecting fraud may trigger cancelling a transaction associated with a user, device and/or account, associated with the fraudulent call. Additionally or alternatively, detecting fraud may trigger detecting a source address associated with the fraudulent call in real-time or near real-time, dropping the fraudulent call in real time, and blocking future traffic from the source address.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
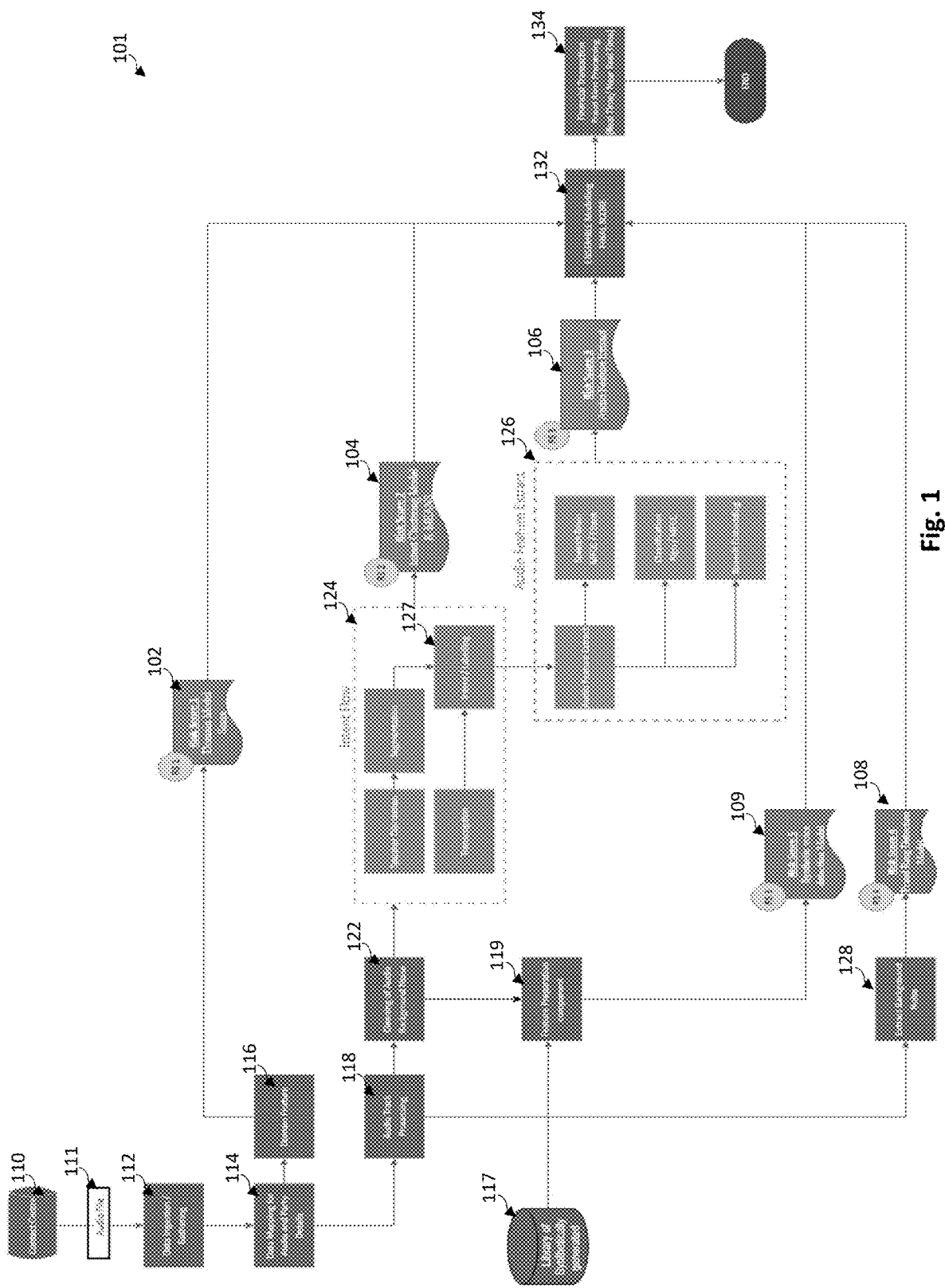
FIG. 1 schematically illustrates a system comprising data structures and executing operations for analyzing audio speech signals using an ensemble model to detect fraudulent calls to a contact center, in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Whereas voice or audio analysis alone is insufficient to predict fraud under use cases 1 and 2 (e.g., deceived by voiceprint or simulated audio impersonations), and cannot be used for cold call use case 3 where no sample audio is stored for comparison, embodiments of the invention solve these deficiencies by detecting fraudulent speakers in all 3 use cases.

Embodiments of the invention may pre-emptively predict whether a caller to a contact center is trying to commit a fraudulent activity and prevent that fraud using an ensemble machine learning model. An ensemble model is a meta-model or a model-of-models combining multiple different machine learning models, that are co-trained, each predicting different fraud type risks. Whereas audio alone is insufficient for fraud detection, the ensemble model integrates the different models with different fraud-detection features, that inform each other's training to intelligently integrate these features to predict fraud more accurately than merely combining multiple independently trained models. According to some embodiments, the ensemble model as described in reference to FIG. 1 may be trained as described in reference to FIG. 2 and executed in a run-time phase as described in reference to FIG. 3.

The multiple different co-trained models integrated into the ensemble may include a speaker audio model modeling an individual speaker's speech (e.g., by extracting Mel-frequency cepstral coefficients (MFCC) features and clustering the MFCC features for each speaker), a prosodic model modeling prosody including patterns of linguistic stress and intonation (e.g., the way a speaker's voice rises and falls), such as, based on rhythm, pitch and loudness, to indicate a speaker's levels of certainty or honesty, a speaker intent model (e.g., using LLM based call transcription) to decipher call meaning (e.g., if the topic is at risk for fraud, such as, transactions), a speaker sentiment model, a synthetic audio model to differentiate authentic vs. synthetic speech audio, a background fraud ring detection model to detect suspicious activity in the background noise (e.g., separated in the audio call signal from the foreground speech analyzed in the other models), a fraud vs. non-fraud cluster model, and account specific domain model. Research indicates that prosodic features drive listeners' perceptions of a speaker's certainty and honesty across pitch and loudness. Listeners can also discern speaker's levels of certainty from pauses and fillers. In particular, combining the prosody model along with speaker intent reveals not only what is being said but how it is said, the combination of which, trained in the ensemble model together, reveals more than either model can alone or combined without ensembling.

Whereas any one of these features may alone be inconclusive, especially for cold calls, together their aggregate improves fraud detection. Ensembling multiple models intelligently trains and integrates each model based on overall prediction accuracy. Without ensembling, fraud prediction cannot know how to combine or interrelate the different factors detected by these different models. In particular, by ensembling all of these features, the different features in each model train each other by inter-model ensemble training, while also preserving each model's independent integrity as a separate model to prevent overfitting (e.g., common when disparate features are co-trained in the same model). Ensembling thus provides a semi-integration and semi-separation of different models that more accurately co-trains fraud detection features than if all models were kept entirely separate (combining only their outputs) or entirely merged into a single model. For example, fraud risk in a foreground speech model attributed to a main foreground speaker may be significantly affected by fraud risk in a background speech model attributed to a secondary background speaker or ambient noise (e.g., predicting background locations that do not align with the main speaker's transcript). Co-training the foreground and background models in the ensemble model captures their integrated behavior that would be otherwise lost in standard separate models and overtrained in combined models. The ensemble model according to embodiments of the invention thus improves the accuracy of cybersecurity for audio speech signal fraud detection.

Figure 4:
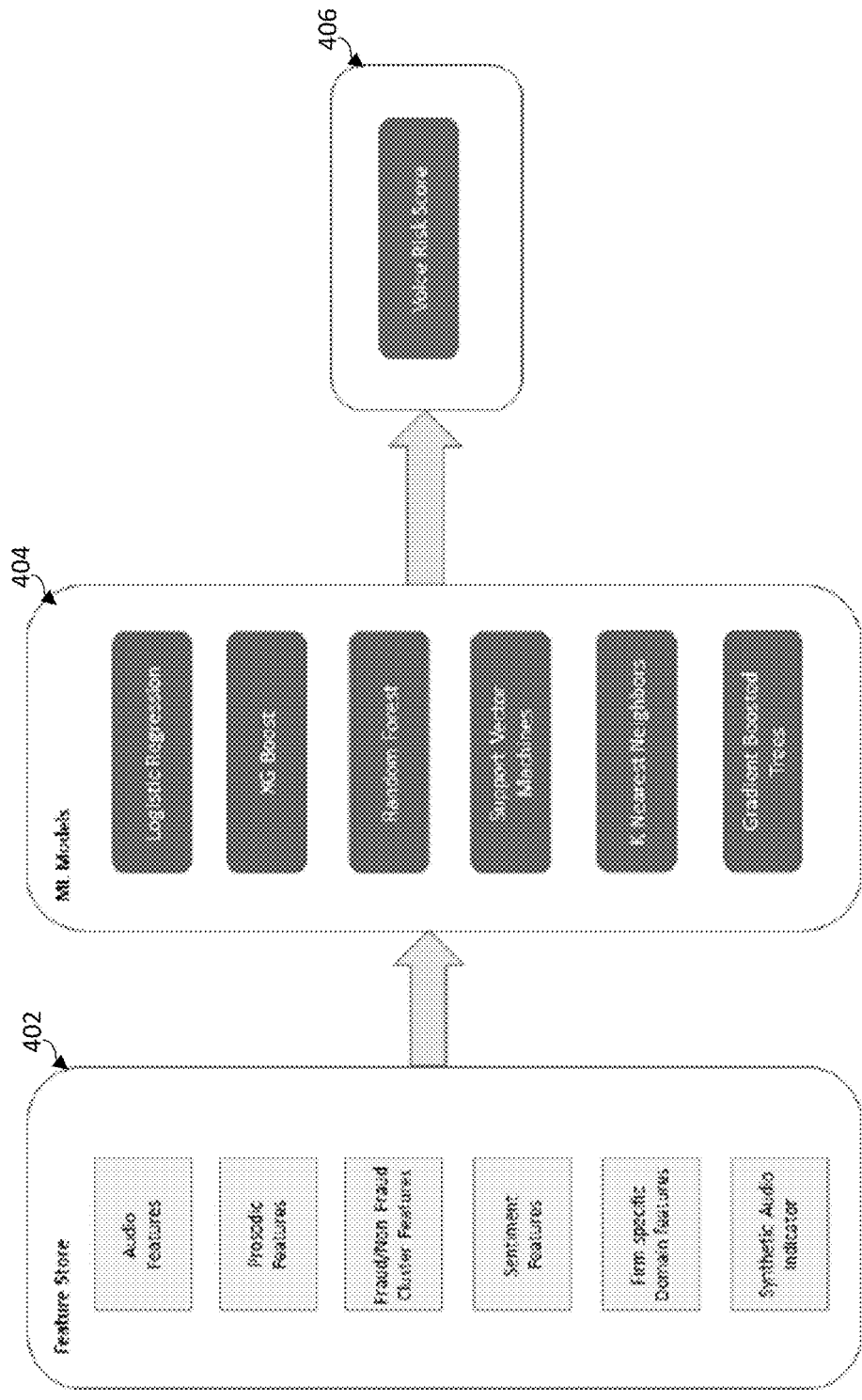
FIG. 4 schematically illustrates data structures for training and inference of an ensemble model to predict a risk of fraudulent calls to a contact center, in accordance with an embodiment of the invention.

Any single or combination of a subset or all of multiple types of machine learning models may be used to train the multiple different fraud models in the ensemble (e.g., as shown in FIG. 4). Types of machine learning models may include logistic regression, XG Boost, random forest, support vector machines, K nearest neighbors, gradient boosted trees, generative AI such as large language models (LLMs) and/or other transformer models, or other ML models. In some embodiments, multiple ML types may be used for each different fraud model. In some embodiments, the ML type used for each different fraud model may be the same or different and may be selected by an ensemble architect or determined that optimizes training for the individual fraud model or the ensemble as a whole.

The ensemble model architecture may combine its multiple models in various layers and hierarchies. In some embodiments, the ensemble model may integrate the multiple models with the same or different model weight, priority or importance. Model weight may be fixed based on importance (e.g., the foreground audio analysis has a higher ensemble weight or significance than background audio analysis). Additionally or alternatively some (or all) models may be weighed dynamically, for example, adjusted or tuned to improve training accuracy or decrease training time. The ensemble model may execute the multiple models in parallel or sequentially, e.g., where one model's output informs another model's input (e.g., the LLM based call transcription model 104 of FIG. 1 generating intent labels for the speaker audio model 106 of FIG. 1). The sequential order of the models may be fixed (e.g., in order of the model's causation where an output of a first model provides input to, and thus precedes, a second model, as in the example above, or in order of priority or accuracy). Where the sequential order of the models is not causally linked, the order can change and adjust dynamically, e.g., periodically or based on priority or accuracy. In some embodiments, some model(s)

may activate other model(s) if a fraud trigger is detected in the initial model(s) (e.g., a single model's individual factor risk) and may otherwise skip activating the other model(s).

Fraud may be detected when a fraud metric is within a positive fraud range (e.g., above a fraud risk threshold, or binary ensemble fraud determination). Detecting fraud may trigger real-time or near real-time fraud prevention. In some embodiments, detecting fraud may trigger a call router to intercept the fraudulent call and/or terminate the call, reroute the call by transferring the call destination to an escalated recipient, and/or add another third line to an escalated recipient. Additionally or alternatively, detecting fraud may trigger a fraud mitigation action, such as, recording the call in an escalated storage location, performing additional second-pass fraud analysis, reordering the call in a priority queue for further analysis, such as an additional fraud detection pass at the same or different more comprehensive ensemble model. Additionally or alternatively, detecting fraud may trigger cancelling a transaction associated with a user, device and/or account, associated with the fraudulent call. Additionally or alternatively, detecting fraud may trigger detecting a source address associated with the fraudulent call in real-time or near real-time, dropping the fraudulent call in real time, and blocking future traffic from the source address.

Reference is made to FIG. 1, which schematically illustrates a system 101 comprising data structures and executing operations for analyzing audio speech signals using an ensemble model to detect fraudulent calls to a contact center, in accordance with an embodiment of the invention.

System 101 of FIG. 1 comprises a contact center 110 (e.g., computing device 100 of FIG. 6) may include, or be operably connected to, an audio recorder to record an audio file 111 of a call in real-time. Audio file 111 is then transferred to, and stored by, a data ingestion device 112 in real-time. System 101 may execute a data mapping 114 to decipher audio and party details and extract domain features 116 that are input into a first "domain" fraud risk model 102. Domain features 116 may include known information about an account or user to detect if the caller's account or device is suspicious, such as, by failing an authentication attempt.

Figure 5:
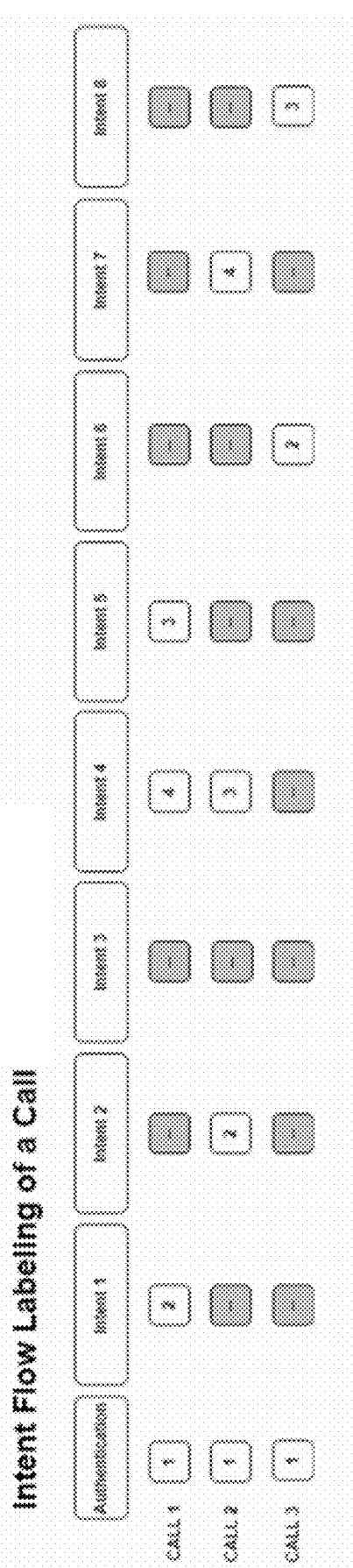
FIG. 5 schematically illustrates data structures for intent flow labels, in accordance with an embodiment of the invention.

System 101 may initiate audio file processing 118 by splitting or separating the audio signal in audio file 111 into a foreground speech signal 122 attributed to a main speaker and a background audio signal 128 comprising the remaining audio, which may be cleaned or further processed. From the foreground speech signal 122, system 101 may use an intent flow model 124 to generate intent labels 127 (e.g., as shown in FIG. 5) based on the main speaker's diarization and segmentation and/or speech transcription. System 101 may input the speaker intent labels into a second "Intent" fraud risk model 104.

From the foreground speech signal 122 (e.g., labeled as the main speaker's audio), system 101 may extract audio features 126, such as, MFCC features, for audio processing, classification and speech encoding. System 101 may input the audio features 126 into a third "Audio" fraud risk model 106.

From the background audio signal 128, system 101 may extract background noise features 128, such as, background environment (e.g., a call center vs. a playground), trigger words (e.g., buy, credit, etc.), or other features indicating a potential fraud ring. System 101 may input the background noise features 128 into a fourth "Fraud Ring" risk model 108.

From the foreground speech signal 122 (e.g., labeled as the main speaker's audio), system 101 may extract features 119 based on a library 117 of voice samples from available or known synthetic voice generation systems. Library 117 may be a dynamic repository, updated e.g. periodically or upon receipt of new data, to keep with contemporary synthetic voice generation system. Extracted features 119 may include, for example, Time-Domain Features (Zero Crossing Rate (ZCR), Signal Energy, RMS Energy, Temporal Centroid), Frequency Domain Features (Spectral Centroids, Spectral BW, Spectral roll-off, spectral flux), Mel Frequency Features (MFCCs, Chroma Features), Deep Learning Features (Raw waveform features, learned representation, Embedding Features). System 101 may input the extracted audio features 119 into a fifth "synthetic voice detection" risk model 109 to detect if the main speaker is real or synthetic.

Fifth Risk Model 109 may be a machine learning model that analyze acoustic, spectral, and temporal and prosodic features. The model 109 may be trained by machine learning approaches (e.g., SVM, Gradient boosted, k-NN) or Deep learning approaches (1D/2D CNN, RNN (LSTM, GRU)).

Additional or alternative fraud risk models include account specific domain model, prosodic model, sentiment model, fraud vs. non-fraud cluster model, or any other model based on one or a combination of multiple intermediate or cumulative features. In some embodiments, the account specific domain model may be trained on features that capture trends associated with an account or by an account holder. In some embodiments a sixth "account specific domain" risk model may predict or indicate suspicious and/or risky behavior based on (in contrast to) historical behavior patterns or trends associated with the account/account holder. These features may include, for example, age of the account holder, net worth of the account holder, change of contact information, intra-day and/or number of failed/skipped/missed authentication attempts. System 101 may output the account specific domain risk score as an individual or cumulative risk score(s) to: (1) a Call Agent, e.g., as an indicator to be cautious throughout a call which has high or above threshold risk score or certain positive indicators of risks. This could be based on risky behavior observed in the past on the account/by the account holder, or if current behavior contrasts with the historical behavior for the account/account holder. (2) Fraud Investigators, e.g., to generate alerts for investigators to preemptively investigate suspicious activities and/or take measures to prevent fraud, before it occurs.

System 101 may combine all fraud risk models 102-109 in ensemble model 132 to output a cumulative fraud risk. Ensemble model 132 may output the cumulative fraud risk as a probability, level, certainty or score on a (e.g., in a discrete or continuous) scale, a multi-category or classification (e.g., high, medium or low level fraud risk), or a determination of fraud or no fraud (e.g., binary).

During a training phase, system 101 may co-train all four fraud risk models 102-108 by ensemble model 132 using a training dataset comprising audio files 111 pre-labeled with verified (e.g., historically known) cumulative fraud risk outputs.

During a run-time phase, system 101 may input a real-time audio file into ensemble model 132 and may output the call's cumulative fraud risk (e.g., while the call is in-progress).

During the run-time phase, the ensemble model 132's cumulative fraud risk output may automatically trigger system 101 to execute a fraud prevention action 134, e.g., upon predicting the call is fraudulent or risk exceeds a threshold. Fraud prevention action 134 may include any one or combination of: automatically storing a duplicate copy of audio file 111 in a secondary (e.g., high-security) storage, rerouting, forwarding or bifurcating the call to add a line to a secondary destination (e.g., call supervisor), terminating the call, blocking or flagging future calls from a user, account or device associated with the call, cancelling a transaction associated with a user, account or device associated with the call, executing an additional second-pass fraud verification analysis on the call, reordering the call in a priority queue for further analysis (e.g., to analyze higher risk calls sooner or with higher priority). System 101 may use a network router to initiate reroute or terminate call traffic.

Figure 2:
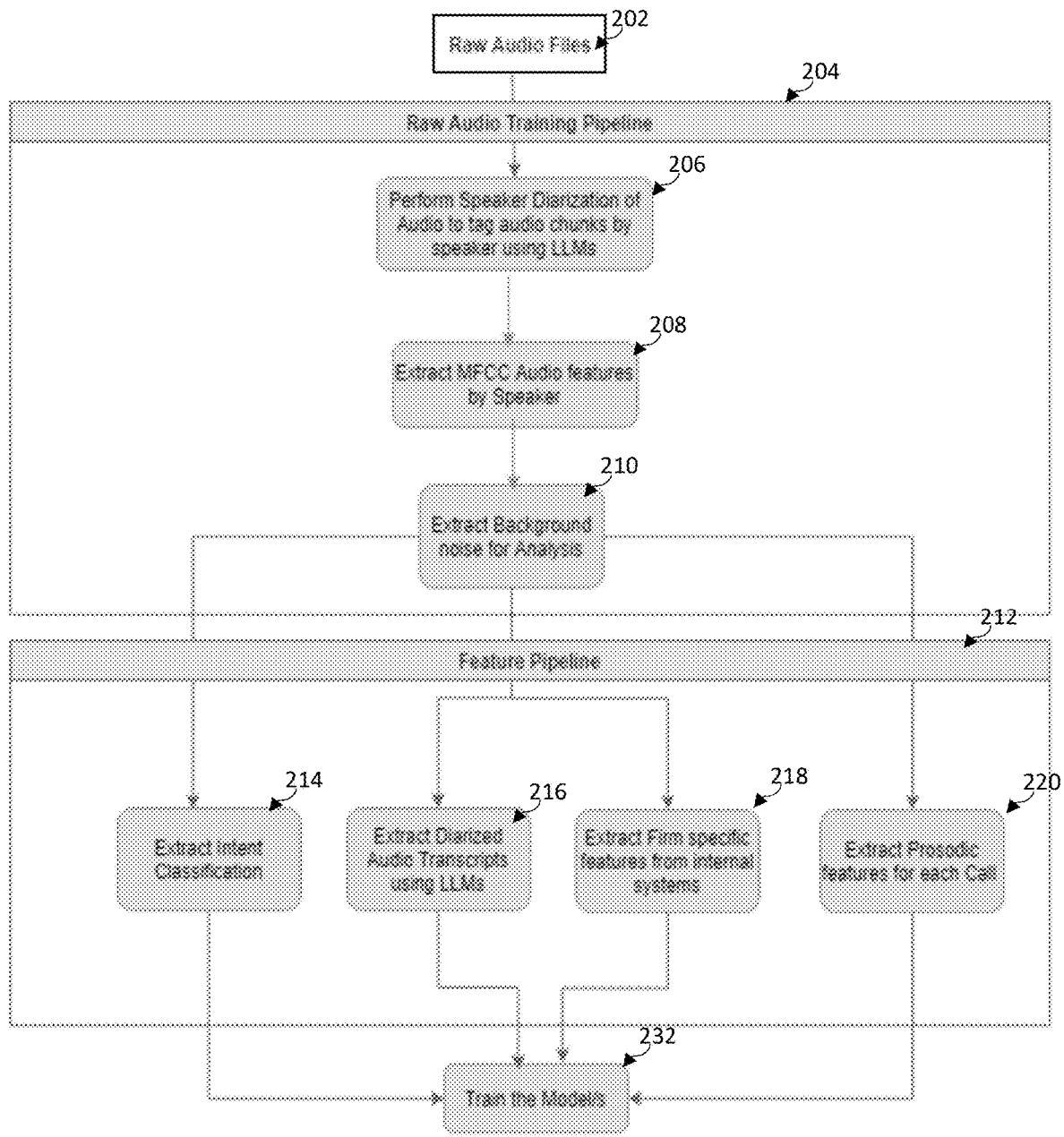
FIG. 2 schematically illustrates data structures and operations for training an ensemble model to detect fraudulent calls to a contact center, in accordance with an embodiment of the invention.

Reference is made to FIG. 2, which schematically illustrates data structures and operations for training an ensemble model (e.g., 132 of FIG. 1) to detect fraudulent calls to a contact center, in accordance with an embodiment of the invention. Embodiments of the invention provide the ensemble model to input extracted audio features, prosodic features, LLM based call transcription, account specific domain features and other fraud risk features, which are then used to train the ensemble model for call classification of the audio file as suspicious or genuine.

In FIG. 2, a system (e.g., 101 of FIG. 1) may execute a raw audio training pipeline 204 to preprocess raw audio files 202. Raw audio files 202 may be curated from past calls to the contact center and are therefore labeled as verified fraud/non-fraud calls. The system may perform speaker diarization 206, e.g., using large language models followed by call transcription and intent classification, to extract diarized audio transcript features 216. The system may extract MFCC audio features 208, e.g., using an audio processing software library. For a given speaker and account, the system may cluster the features using a clustering model like GMM to detect anomalies. The model probability is then used as a feature. Prosodic features may be extracted 220 during preprocessing from MFCC data. Background noise may be extracted 210 and analyzed for fraud ring identification by identifying similar patterns. Lastly, using pretrained models on the audio, a synthetic voice indicator is derived. Feature engineering pipeline 212 may augment the features extracted from raw audio training pipeline 204 with firm or domain specific internal account features 218. Using the derived audio, prosodic and account features, the system may train an ensemble model 232 to predict a probability that the call is fraudulent.

Figure 3:
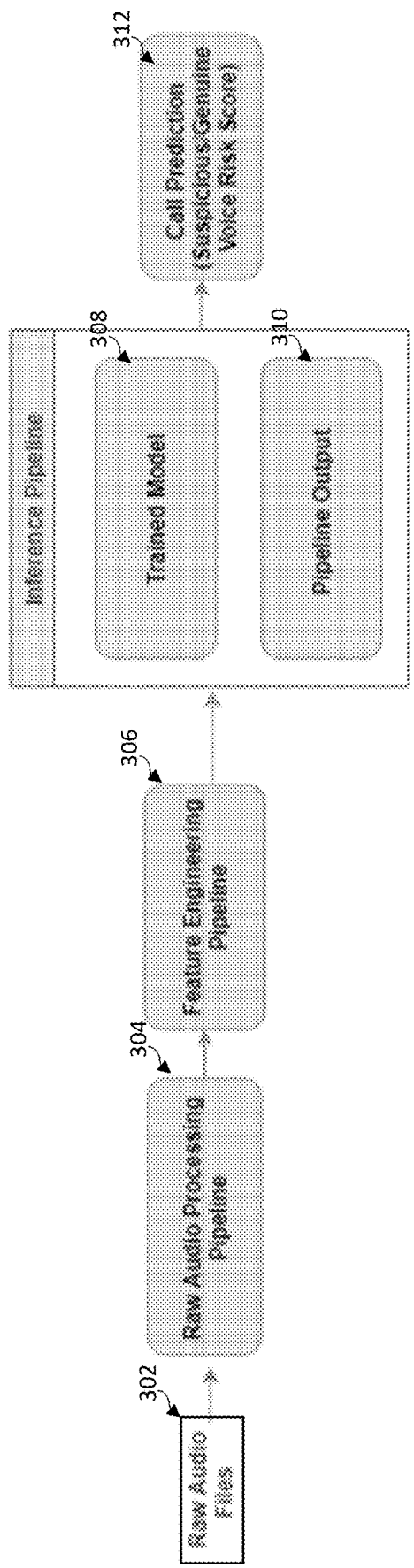
FIG. 3 schematically illustrates data structures and operations for inference or prediction of fraudulent calls to a contact center using an ensemble network in a run-time phase, in accordance with an embodiment of the invention.

Reference is made to FIG. 3, which schematically illustrates data structures and operations for inference or prediction of fraudulent calls to a contact center using an ensemble network in a run-time phase, in accordance with an embodiment of the invention.

In FIG. 3, a system (e.g., 101 of FIG. 1) may input raw audio files recording an incoming call to a contact center. When new call is received, its audio file is recorded and the system may execute a raw audio processing pipeline (e.g., 204 of FIG. 2) and a feature engineering pipeline (e.g., 212 of FIG. 2) (e.g., sequentially or in parallel). The system may then input the pipeline output 310 into the ensemble model 308 (e.g., trained as described in FIG. 2) to generate an ensemble output 312, e.g., identifying the call as suspicious or genuine and/or determining a fraud risk score probability assigned to each call to quantify a degree of risk. This score may be assigned in real-time or near real-time. A suspicious call or out-of-range fraud risk score may trigger the system to issue a red flag for a financial transaction or other activity for a user, account or device associated with the call, that may subject it to more scrutiny before execution.

Reference is made to FIG. 4, which schematically illustrates data structures for training and inference of an ensemble model (e.g., 132 of FIG. 1) to predict a risk of fraudulent calls to a contact center, in accordance with an embodiment of the invention.

The ensemble model may be trained with any of the above fraud risk models 402 using any type of machine learning models 404, such as, logistic regression, XG Boost, random forest, support vector machines, K nearest neighbors, gradient boosted trees, and/or generative AI models such as large language models (LLMs) or other transformer models, to output a fraud risk score 406. Out of twelve classifiers trained, logistic regression and random forest showed the best results in predicting the fraudulent calls.

Reference is made to FIG. 5, which schematically illustrates data structures for intent flow labels (e.g., 127 of FIG. 1), in accordance with an embodiment of the invention. In FIG. 5, each call recording is labeled with an intent flow vector indicating the occurrence of each of a plurality of types of intents (e.g., intent 1-7) and the order of their detection. The speaker intent model may classify intent based on a chronological order of multiple intent labels identified during a single call. Other intent flow labeling information or syntax may be used.

Figure 6:
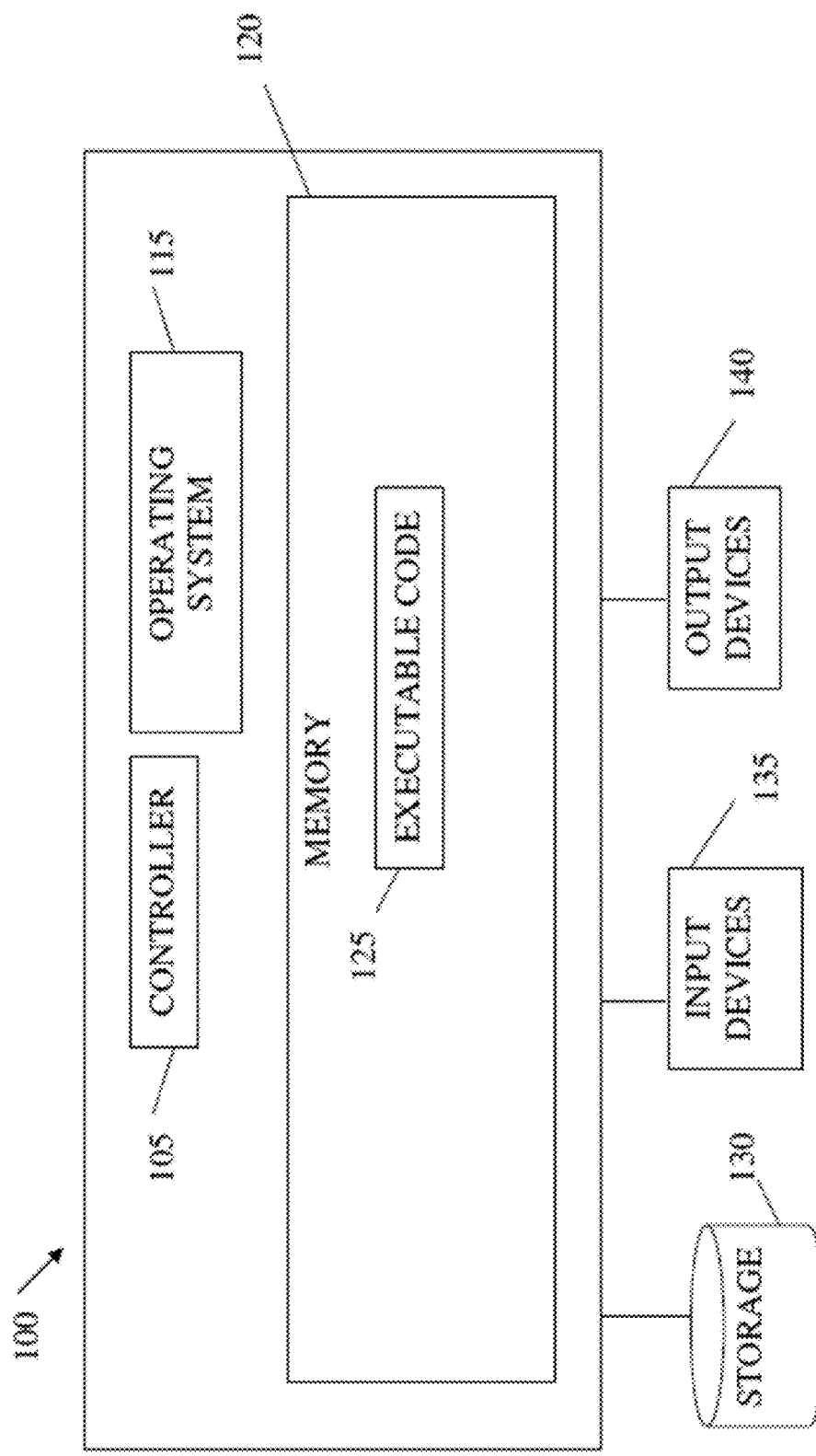
FIG. 6 schematically illustrates a system for analyzing audio speech signals using an ensemble model to detect fraudulent calls to a contact center, in accordance with some embodiments of the invention.

The steps and data structures depicted in FIGS. 1-5 may be performed, generated and/or stored using the devices, networks and/or hardware of FIG. 6 (alternatively, other hardware may be used).

In some embodiments, when a caller dials into a contact center there is a likelihood that the caller is fraudster. The system provides robust safeguards to prevent monetary losses, reputational loss and account takeover in order to protect associated users, accounts, firms and/or assets. A blend of audio features, firm or account specific features, and LLM models may be used to derive a voice score in near real-time to prevent fraudulent activity or account takeover risks.

The risk score that is derived from the ensemble model may take into consideration various aspects of the call and may be fed into financial and non-financial transaction processing modules to enable decision making.

The risk score may be computed based on the following:
Unique profile of the Account and Account owner
Caller objectives
Potential for fraud loss
Criticality of the financial transaction The Risk Score may then be fed to a fraud alert processing system in real-time or near real-time so that further action can be taken automatically, for example:
1) Escalate the request for further review before acting on it, e.g.:
update Personal Details of the Account owner
change in nominee etc.
2) Put a Hold on a Financial transaction so further checks can be made, e.g.:
Account Takeover
Sender/Receiver reports a Fraudulent transaction
Anomalous pattern of transaction
3) Red Flag/Cancel a transaction if warranted depending on the severity of the outcome, e.g.:
In cases when a fraudulent caller is identified beyond doubt, the caller request would be Red Flagged and cancelled.
Account reported by Financial Crimes department Reference is made to FIG. 6, which schematically illustrates a system for analyzing audio speech signals using an ensemble model to detect fraudulent calls to a contact center, in accordance with some embodiments of the invention. Computing device 100 may be a contact center or external system server and may include a controller or computer processor 105 that may be, for example, a central processing unit processor (CPU), a chip or any suitable computing device, an operating system 115, a memory 120, a storage 130, input devices 135 and output devices 140 such as a computer display or monitor displaying for example a computer desktop system. Each data structure, programming code, algorithm, and/or equipment discussed herein may be or include, or may be executed by, a computing device such as included in FIG. 6, although various units among these may be combined into one computing device. Computing device 100 may be operatively connected to an audio call recorder for recording raw audio files of calls and a contact center router for routing the calls to a destination (e.g., contact center agent computer or telephone).

Operating system 115 may be or may include code to perform tasks involving coordination, scheduling, arbitration, or managing operation of computing device 100, for example, automated real-time compliance testing of transaction streams. Memory 120 may be or may include, for example, a Random Access Memory (RAM), a read only memory (ROM), a Flash memory, a volatile or non-volatile memory, or other suitable memory units or storage units. Memory 120 may be or may include a plurality of different memory units. Memory 120 may store for example, instructions (e.g. code 125) to carry out a method as disclosed herein, and/or data such as low-level action data, output data, etc.

Executable code 125 may be any application, program, process, task or script. Executable code 125 may be executed by controller 105 possibly under control of operating system 115. For example, executable code 125 may be one or more applications performing methods as disclosed herein. In some embodiments, more than one computing device 100 or components of device 100 may be used. One or more processor(s) 105 may be configured to carry out embodiments of the present invention by for example executing software or code. Storage 130 may be or may include, for example, a hard disk drive, a floppy disk drive, a Compact Disk (CD) drive, a universal serial bus (USB) device or other suitable removable and/or fixed storage unit. Data described herein may be stored in a storage 130 and may be loaded from storage 130 into a memory 120 where it may be processed by controller 105. Storage 130 may store recorded raw audio files of calls.

Input devices 135 may be or may include a mouse, a keyboard, a touch screen or pad or any suitable input device or combination of devices, which may be operated by for example a compliance officer. Output devices 140 may include one or more displays, speakers and/or any other suitable output devices or combination of output devices. Any applicable input/output (I/O) devices may be connected to computing device 100, for example, a wired or wireless network interface card (NIC), a modem, printer, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Operations described in reference to FIGS. 1-5 may be executed using hardware devices described in reference to FIG. 6 e.g. device 100 using one or more processor(s) (e.g., controller 105 of FIG. 6). Additionally or alternatively, other devices may be used.

Contact center and call center are used synonymously herein and encompass calls or contact by any communication medium or technology including voice-only, voice and image or video, multi-media, etc. When used herein, a "call" may include any communication over devices and networks transmitting an audio speech signal including the "plain old telephone system" (POTS), VOIP telephone calls, calls using smartphones, mobile devices or personal computers, and may include audio only, or a combination of audio and video. "Calling" may refer to a "caller" speaker (a real human or a synthetic simulation, automation or impersonation) to speak with another a "callee" speaker (real or synthetic).

When used herein, "fraud" or "fraudulent" speaker or call may include any that is determined or predicted to attempt to misrepresent its identity, misrepresent its authenticity initiated by a real human or synthetic computerized device, initiate unauthorized processes or transactions, exhibit anomalous behavior, etc. Whereas fraudulent calls in a training dataset are typically verified, calls predicted by the ensemble to be fraudulent are initially not. Predicted fraudulent calls may undergo a subsequent (e.g., second pass) verification process to confirm the prediction (e.g., two-form authentication or speaker or transaction interrogation).

It may be appreciated that "real-time" may refer to instantly or, more often, at a small time delay of, for example, between 0.01 and 10 seconds, during, concurrently, or substantially at the same time as. Analyzing speech signals, intercepting, rerouting or terminating calls, and/or sending an agent device recommendations e.g., via agent monitor, may all be performed, for example, at the same time as, at a time delay from, or during the same communication (e.g., telephone and/or web) session as the call. The recommendations may be provided in text or as automatically generated speech.

Embodiments of the invention may improve the technologies of computer automation, machine learning, computer bots, big data analysis, and computer use and automation of fraud detection by using specific algorithms to analyze large pools of data, a task which is impossible, in a practical sense, for a person to carry out in real-time. Embodiments may more effectively, quickly and accurately identify fraudulent or suspicious transactions in real-time to pre-empt and prevent fraud.

One skilled in the art will realize the invention may be embodied in other specific forms without departing from the spirit or essential characteristics thereof. The embodiments described herein are therefore to be considered in all respects illustrative rather than limiting. In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention.

Embodiments may include different combinations of features noted in the described embodiments, and features or elements described with respect to one embodiment or flowchart can be combined with or used with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

The invention claimed is:

1. A method for analyzing audio speech signals to detect fraudulent calls to a contact center, the method comprising:
   splitting an audio recording of a call in real-time into a foreground speech signal attributed to a main speaker and a background audio signal;
   extracting audio features from the foreground speech signal and the background audio signal;
   inputting the extracted audio features into an ensemble model, wherein the ensemble model comprises multiple different machine learning models co-trained to cumulatively detect fraud, wherein the multiple different machine learning models include:
      a speaker audio model to detect audio speech anomalies in the foreground speech signal attributed by clustering to the main speaker,
      a speaker intent model to classify intent of the main speaker in the foreground speech signal using a large language model and call transcription,
      a synthetic audio model to detect if the main speaker is real or synthetic, and
      a prosody model to detect voice intonation of the main speaker in the foreground speech signal; and
   outputting, by the ensemble model, a prediction of whether the call is fraudulent.

2. The method of claim 1, wherein the ensemble model further includes one or more machine learning models selected from the group consisting of: a fraud ring model to detect fraud risk anomalies of one or more secondary speakers in the background audio signal, a fraud vs. non-fraud cluster model, and an account specific domain model.

3. The method of claim 1 comprising extracting the audio features as Mel-frequency cepstral coefficients (MFCC) features and clustering the MFCC features to attribute to the main speaker.

4. The method of claim 1 comprising, upon predicting it is fraudulent, intercepting the call by executing an action selected from the group consisting of: terminating the call, rerouting the call by transferring the call destination to an escalated recipient, and adding a third line in the call to an escalated recipient.

5. The method of claim 1 comprising, upon predicting the call is fraudulent:
   detecting a source address associated with the call in real-time;
   dropping the fraudulent call in real-time; and
   blocking future traffic from the source address.

6. The method of claim 1 comprising, upon predicting the call is fraudulent, cancelling a transaction associated with a user, account or device associated with the call.

7. The method of claim 1 comprising, upon predicting the call is fraudulent, executing a fraud mitigation action selected from the group consisting of: recording the call in an escalated storage location, performing additional second-pass fraud verification analysis on the call, and reordering the call in a priority queue for further analysis.

8. The method of claim 1, wherein the call is a cold call in which the main speaker is not recognized as having previously contacted the contact center.

9. The method of claim 1, wherein the multiple different machine learning models have a type selected from the group consisting of: logistic regression, XG Boost, random forest, support vector machines, K nearest neighbors, gradient boosted trees, and large language model (LLM).

10. The method of claim 1 comprising training the ensemble model using a training dataset comprising input-output pairs of audio file inputs and verified fraud label outputs.

11. The method of claim 1, wherein the speaker intent model is configured to classify intent based on a chronological order of multiple intent labels identified during a single call.

12. A system for analyzing audio speech signals to detect fraudulent calls to a contact center, the system comprising:
   a storage device to store an audio recording of a call in real-time; and
   one or more processors configured to:
      split an audio recording of a call in real-time into a foreground speech signal attributed to a main speaker and a background audio signal,
      extract audio features from the foreground speech signal and the background audio signal,
      input the extracted audio features into an ensemble model, wherein the ensemble model comprises multiple different machine learning models co-trained to cumulatively detect fraud, wherein the multiple different machine learning models include:
         a speaker audio model to detect audio speech anomalies in the foreground speech signal attributed by clustering to the main speaker,
         a speaker intent model to classify intent of the main speaker in the foreground speech signal using a large language model and call transcription,
         a synthetic audio model to detect if the main speaker is real or synthetic, a prosody model to detect voice intonation of the main speaker in the foreground speech signal, and
      output, by the ensemble model, a prediction of whether the call is fraudulent.

13. The system of claim 12, wherein the ensemble model further includes one or more machine learning models selected from the group consisting of: a fraud ring model to detect fraud risk anomalies of one or more secondary speakers in the background audio signal, a fraud vs. non-fraud cluster model, and an account specific domain model.

14. The system of claim 12, wherein the one or more processors are further configured to extract the audio features as Mel-frequency cepstral coefficients (MFCC) features and cluster the MFCC features to attribute to the main speaker.

15. The system of claim 12 comprising a network router configured to, upon predicting the call is fraudulent, intercept the call by executing an action selected from the group consisting of: terminate the call, reroute the call by transferring the call destination to an escalated recipient, and add a third line in the call to an escalated recipient.

16. The system of claim 12, wherein the one or more processors are further configured to, upon predicting the call is fraudulent:
   detect a source address associated with the call in real-time,
   drop the fraudulent call in real-time, and
   block future traffic from the source address.

17. The system of claim 12, wherein the one or more processors are further configured to, upon predicting the call is fraudulent, cancel a transaction associated with a user, account or device associated with the call.

18. The system of claim 12, wherein the one or more processors are further configured to, upon predicting the call is fraudulent, execute a fraud mitigation action selected from the group consisting of: record the call in an escalated storage location, perform additional second-pass fraud verification analysis on the call, and reorder the call in a priority queue for further analysis.

19. The system of claim 12, wherein the multiple different machine learning models have a type selected from the group consisting of: logistic regression, XG Boost, random forest, support vector machines, K nearest neighbors, gradient boosted trees, and large language model (LLM).

20. The system of claim 12, wherein the one or more processors are further configured to train the ensemble model using a training dataset comprising input-output pairs of audio file inputs and verified fraud label outputs.

21. The system of claim 12 comprising an audio recorder to capture the audio recording of the call in real-time.

22. The system of claim 12, wherein the speaker intent model is configured to classify intent based on a chronological order of multiple intent labels identified during a single call.

* * * * *